(12) United States Patent
Ubale

(10) Patent No.: US 11,577,667 B2
(45) Date of Patent: Feb. 14, 2023

(54) BADGE MOUNTING SYSTEM FOR A TRIM ASSEMBLY

(71) Applicant: FAURECIA AUTOMOTIVE SEATING, LLC, Auburn Hills, MI (US)

(72) Inventor: Sachin Ubale, Troy, MI (US)

(73) Assignee: FAURECIA AUTOMOTIVE SEATING, LLC, Auburn Hills, MI (US)

( * ) Notice: Subject to any disclaimer, the term of this patent is extended or adjusted under 35 U.S.C. 154(b) by 193 days.

(21) Appl. No.: 17/165,838

(22) Filed: Feb. 2, 2021

(65) Prior Publication Data
US 2022/0242334 A1 Aug. 4, 2022

(51) Int. Cl.
*B60R 13/02* (2006.01)
*B62D 27/02* (2006.01)

(52) U.S. Cl.
CPC ........ *B60R 13/0206* (2013.01); *B62D 27/026* (2013.01)

(58) Field of Classification Search
CPC .......................... B62D 27/026; B60R 13/0206
See application file for complete search history.

(56) References Cited

U.S. PATENT DOCUMENTS

| 8,459,713 | B2 | 6/2013 | Sella |
| 9,272,672 | B2 * | 3/2016 | Vo ..................... B60R 13/0256 |
| 10,507,764 | B2 * | 12/2019 | Schneider ............. B60Q 3/745 |
| 2013/0107046 | A1 * | 5/2013 | Forgue ................... B60R 19/52 348/148 |

FOREIGN PATENT DOCUMENTS

| DE | 29607536 U1 | 7/1996 |
| DE | 102008005419 B3 | 7/2009 |
| DE | 102019104972 B3 * | 4/2020 |
| DE | 102019104972 B3 | 4/2020 |
| GB | 2300159 A | 10/1996 |
| KR | 200385471 Y1 | 5/2005 |

\* cited by examiner

*Primary Examiner* — D Glenn Dayoan
*Assistant Examiner* — Melissa Ann Bonifazi
(74) *Attorney, Agent, or Firm* — Reising Ethington P.C.

(57) ABSTRACT

A badge mounting system that helps promote proper installation of different badges for different vehicle trim variants. The system utilizes a set of trim assembly components that include: a badge having a plurality of badge studs protruding rearwardly in a first pattern; a trim layer having a plurality of trim holes corresponding to the plurality of badge studs and arranged in the first pattern; and a backing plate having a backing plate body with an outer perimeter circumscribing a plurality of recesses extending into the backing plate body, wherein the plurality of badge studs mate with a subset of the plurality of recesses that together form the first pattern, and wherein the first pattern of badge studs is arranged such that the badge can be mounted to the backing plate through the trim layer in only a single orientation of the badge relative to the trim layer.

15 Claims, 7 Drawing Sheets

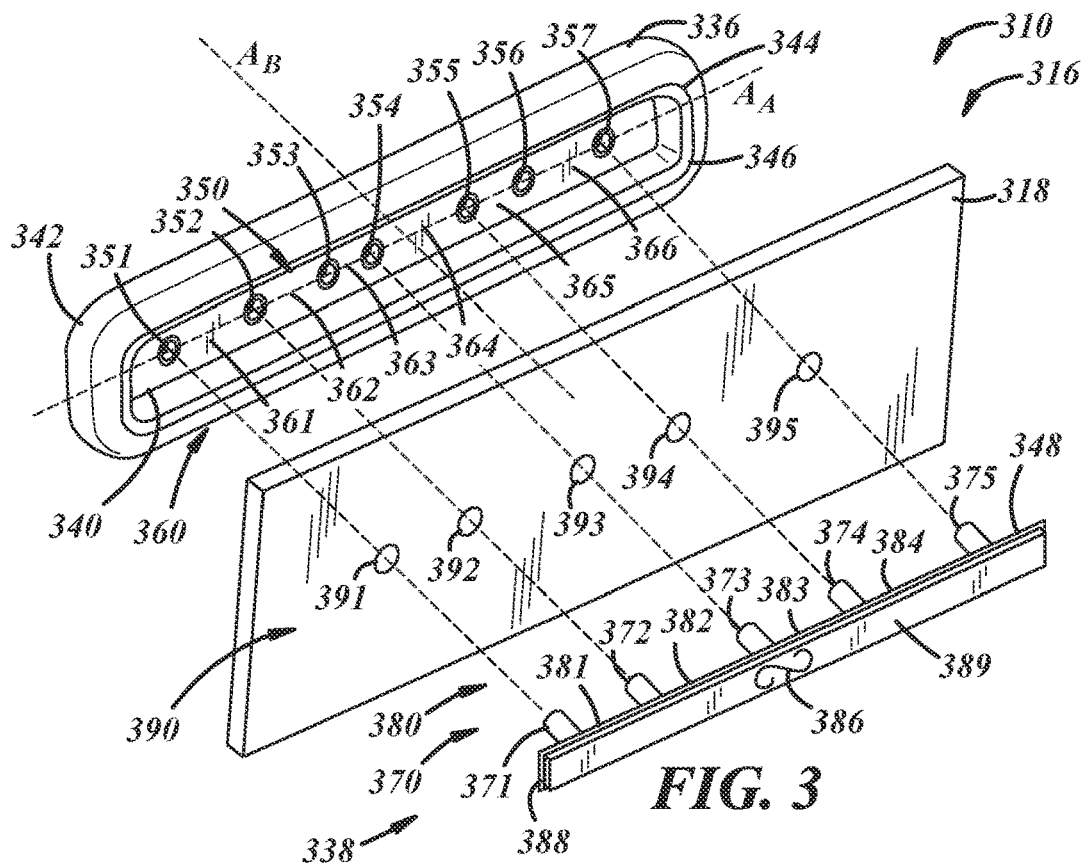
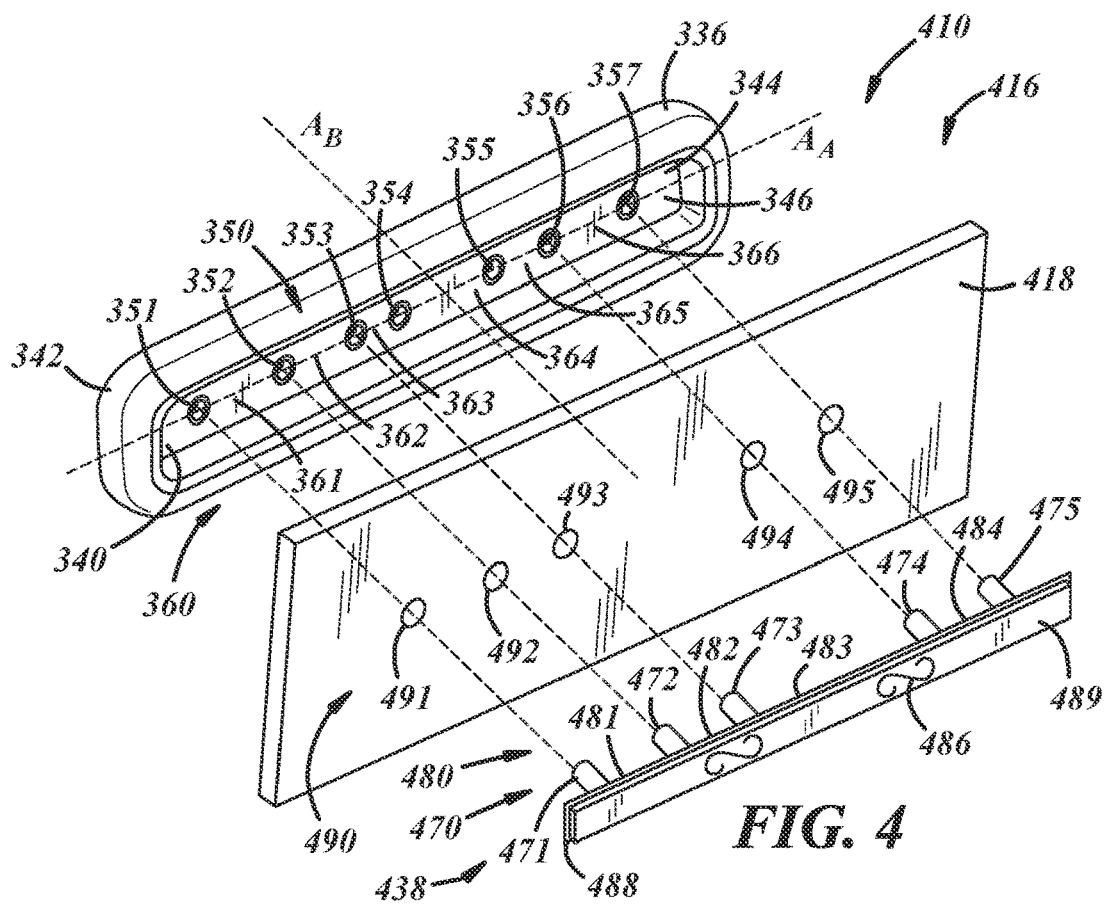

BADGE MOUNTING SYSTEM FOR A TRIM ASSEMBLY

TECHNICAL FIELD

The present disclosure relates to techniques for mounting emblems or badges to vehicle trim assemblies.

BACKGROUND

With some vehicle components, such as vehicle seats, different badges are sometimes used for different trim variants of the particular seat or vehicle model. Thus, part of the seat manufacture involves installing the correct badge on the particular seat or trim variant being assembled. Moreover, even when the correct badge is used, it may be possible to inadvertently install the badge in an improper orientation (e.g., upside down). Promoting proper installation of the badge on the vehicle component is desirable.

DE 29607536 U1 and DE 102008005419 B3 describe backing plates that can be used in a badge assembly. However, the backing plates in these implementations do not remedy the installation problems described above.

SUMMARY

In accordance with one or more embodiments, a set of trim assembly components includes: a badge having a front decorative side and a rear side, the badge including a plurality of badge studs protruding rearwardly from the rear side in a first pattern; a trim layer having a plurality of trim holes corresponding to the plurality of badge studs, wherein the plurality of trim holes are arranged in the first pattern and are sized such that the plurality of badge studs fit through the plurality of trim holes; and a backing plate having a backing plate body with an outer perimeter circumscribing a plurality of recesses extending into the backing plate body, wherein the plurality of badge studs mate with a subset of the plurality of recesses that together form the first pattern, and wherein the first pattern of badge studs is arranged such that the badge can be mounted to the backing plate through the trim layer in only a single orientation of the badge relative to the trim layer.

In accordance with another embodiment, a trim assembly comprises the set of trim assembly components defined in the preceding paragraph, wherein the badge, trim layer, and backing plate are assembled together with the plurality of badge studs extending through the plurality of trim holes and into the subset of the plurality of recesses to thereby form a completed trim assembly.

In various embodiments the trim assembly can include any of the following features or any technically feasible combination of the following features:
- at least two recesses of the plurality of recesses define an attachment axis that passes through the at least two recesses, wherein the at least two recesses accommodate at least two badge studs of the plurality of badge studs, and wherein the plurality of badge studs, the plurality of trim holes, and/or the plurality of recesses is non-symmetrically arranged with respect to a bisecting axis that is orthogonal to the attachment axis and bisects the backing plate body;
- the plurality of recesses includes a first recess, a second recess, a third recess, and a fourth recess that are all aligned along the attachment axis;
- a first space between the first recess and the second recess is equal in size to a second space between the second recess and the third recess, and wherein a first space between the first recess and the second recess is different in size than a third space between the third recess and the fourth recess;
- the plurality of recesses, the plurality of trim holes, and the plurality of badge studs are each non-symmetrically arranged with respect to the bisecting axis;
- the plurality of recesses are arranged symmetrically relative to a plane that is orthogonal to a lengthwise direction of the backing plate and, optionally, the first pattern of badge studs is symmetrical relative to a plane that is orthogonal to a lengthwise direction of the badge;
- the plurality of recesses is configured to accommodate at least three stud variation spacing patterns;
- the recesses comprise apertures through which the badge studs can pass, wherein badge studs are made of a plastic that allow the badge to be securely attached to the backing plate by heat staking a portion of the badge studs that extend rearwardly past the apertures when the badge is attached over the trim layer to the backing plate;
- the badge includes an emblem comprising the front decorative side and a support plate comprising the rear side and the plurality of badge studs.

In accordance with other embodiments, a badge mounting system is provided for use in mounting different badges that designate different trim variants of a vehicle model or vehicle component. The system includes the set of trim assembly components defined above, wherein the trim layer comprises a first trim layer and the badge comprises a first badge corresponding to a first trim variant, and a second badge corresponding to a second trim variant, the second badge having a front decorative side that is different than the front decorative side of the first badge and having a rear side with a plurality of badge studs protruding rearwardly from the rear side of the second badge, the plurality of badge studs of the second badge being arranged in a second pattern that is different than the first pattern. The subset of the plurality of recesses that forms the first pattern comprises a first subset of recesses, and wherein the plurality of badge studs of the second badge mate with a second subset of the plurality of recesses of the backing plate that together form the second pattern, whereby the backing plate comprises a common backing plate that can be used for either the first or second trim variants.

In various embodiments the badge mounting system can include any of the following features or any technically feasible combination of the following features:
- the badge mounting system further comprises a second trim layer having a plurality of trim holes arranged in the second pattern and sized such that the plurality of badge studs of the second badge fit through the plurality of trim holes of the second trim layer, wherein the second pattern of badge studs is arranged such that the second badge can be mounted to the common backing plate through the second trim layer in only one orientation of the second badge relative to the second trim layer, and wherein each of the first and second patterns of badge studs include at least one badge stud that is located in a position within its respective pattern that is unique to that pattern relative to the other pattern, whereby the first badge cannot be mounted onto the second trim layer due to contact of the at least one badge stud with the second trim layer at a location in the second trim layer where there is no trim hole through which the at least one badge stud can pass, and whereby the second badge cannot be mounted onto the first trim layer due to contact of the at least one badge stud with the first trim layer at a location in the first trim layer where there is no trim hole through which the at least one badge stud can pass.

the badge mounting system further comprises: a third badge corresponding to a third trim variant, the third badge having a front decorative side that is different than the front decorative side of the first and second badges and having a rear side with a plurality of badge studs protruding rearwardly from the rear side of the third badge, the plurality of badge studs of the third badge being arranged in a third pattern that is different than the first and second patterns; and a third trim layer having a plurality of trim holes arranged in the third pattern and sized such that the plurality of badge studs of the third badge fit through the plurality of trim holes of the third trim layer, wherein the plurality of badge studs of the third badge mate with a third subset of the plurality of recesses of the backing plate that together form the third pattern, and wherein the third pattern of badge studs is arranged such that the third badge can be mounted to the backing plate through the trim layer in a sole orientation of the third badge relative to the third trim layer.

the third pattern of badge studs includes one or more badge studs that mates with one of the plurality of recesses and that is located in a position within the third pattern that is unique to that pattern relative to the first pattern of badge studs, and wherein the third pattern of badge studs includes one or more badge studs that mates with one of the plurality of recesses and that is located in a position within the third pattern that is unique to that pattern relative to the second pattern of badge studs, whereby the first badge can be mounted to the common backing plate only through the first trim layer and not through the second or third trim layers, and can only be mounted to the common backing plate through the first trim layer in the single orientation, and whereby the second badge can be mounted to the common backing plate only through the second trim layer and not through the first or third trim layers, and can only be mounted to the common backing plate through the second trim layer in the one orientation, and whereby the third badge can be mounted to the common backing plate only through the third trim layer and not through the first or second trim layers, and can only be mounted to the common backing plate through the third trim layer in the sole orientation.

Various aspects, embodiments, examples, features, and alternatives set forth in the preceding paragraphs, in the claims, and/or in the following description and drawings may be taken independently or in any combination thereof. For example, features disclosed in connection with one embodiment are applicable to all embodiments in the absence of incompatibility of features.

BRIEF DESCRIPTION OF THE DRAWINGS

Example embodiments will hereinafter be described in conjunction with the appended drawings, wherein like designations denote like elements, and wherein:

FIGS. 3-5 together depict a first embodiment of a badge mounting system for which FIG. 3 is an exploded view showing a set of trim assembly components that includes a first badge, a first partial trim layer, and a common backing plate, FIG. 4 is an exploded view showing a second set of trim assembly components that includes a second badge, a second partial trim layer, and the common backing plate, and FIG. 5 is an exploded view showing a third set of trim assembly components that include a third badge, a third partial trim layer, and the common backing plate;

FIGS. 6-7 together depict a second embodiment of a badge mounting system for which FIG. 6 is an exploded view showing a set of trim assembly components that includes a first badge, a first partial trim layer, and a common backing plate, and FIG. 7 is an exploded view showing a second set of trim assembly components that includes a second badge, a second partial trim layer, and the common backing plate.

DETAILED DESCRIPTION

Illustrated in the figures and described below are three embodiments of a badge mounting system that can be used to manufacture any of a number of different trim assemblies in a manner that permits error-proof selection and alignment of different badges for different trim variants. The trim assembly components described herein include a common backing plate that is capable of receiving multiple badge variations, while promoting proper installation of each variation. Together, these components provide poka-yoke (i.e., mistake-proof) assembly of a badge on a vehicle trim that solves two problems: installation of the correct badge and installation of the correct badge in the proper orientation. The common backing plate of the trim assembly has an arrangement of recesses that accommodate studs that extend from the badge through holes in a trim layer and into the recesses of the backing plate. These studs, trim holes, and recesses are fixturing features that can be arranged relative to each other to allow for multiple variations of the badge, while error-proofing installation of the badge such that only the correct badge for a particular trim can be installed and only in the proper orientation.

For any particular trim variant, in each of the embodiments below the set of trim assembly components includes: a badge having a front decorative side and a rear side, the badge including a plurality of badge studs protruding rearwardly from the rear side in a first pattern; a trim layer having a plurality of trim holes corresponding to the plurality of badge studs, wherein the plurality of trim holes are arranged in the first pattern and are sized such that the plurality of badge studs fit through the plurality of trim holes; and a backing plate having a backing plate body with an outer perimeter circumscribing a plurality of recesses extending into the backing plate body, wherein the plurality of badge studs mate with a subset of the plurality of recesses that together form the first pattern, and wherein the first pattern of badge studs is arranged such that the badge can be mounted to the backing plate through the trim layer in only a single orientation of the badge relative to the trim layer. Various approaches to creating this set of trim assembly components as part of an overall badge mounting system will be described below.

Figure 1:
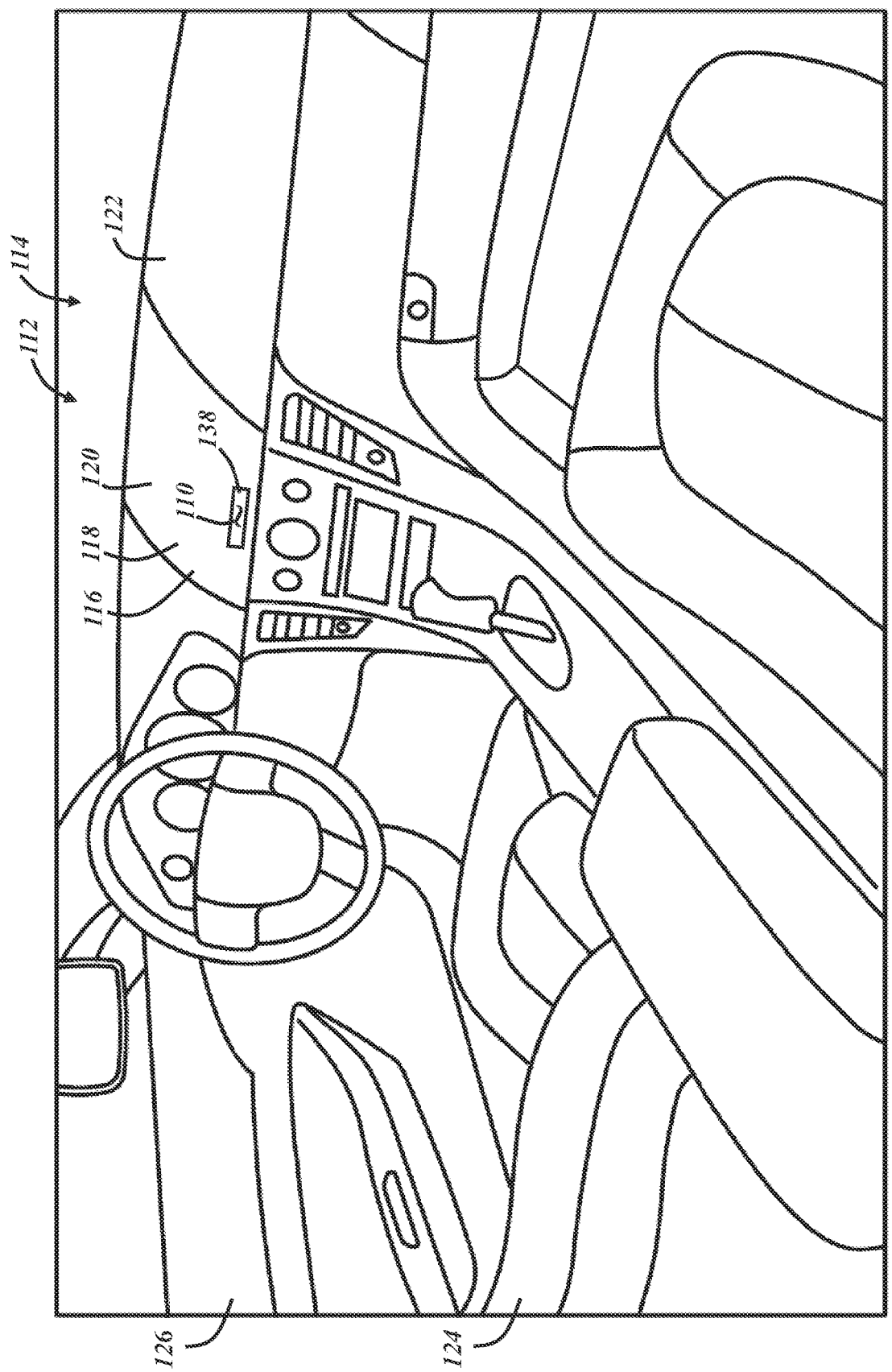
FIG. 1 is a perspective view of an embodiment of a passenger cabin of a vehicle showing one example trim assembly.

FIG. 1 illustrates an example badge assembly 110 located in the passenger cabin 112 of vehicle 114. The badge assembly 110 is advantageously integrated with a trim assembly 116, such that the badge assembly 210 forms a part of the trim assembly 116. The trim assembly includes a trim layer 118 that comprises a covering of a vehicle component 120. The vehicle component 120 in the FIG. 1 embodiment is an instrument panel 122; however, as detailed below, the badge assembly 110 can be used in a number of different applications, such as on a seat 124, door trim 126, or in another vehicle location, to cite just a few examples. Throughout the description of the badge assembly 110, like reference numerals are used to disclose like features.

Figure 2:
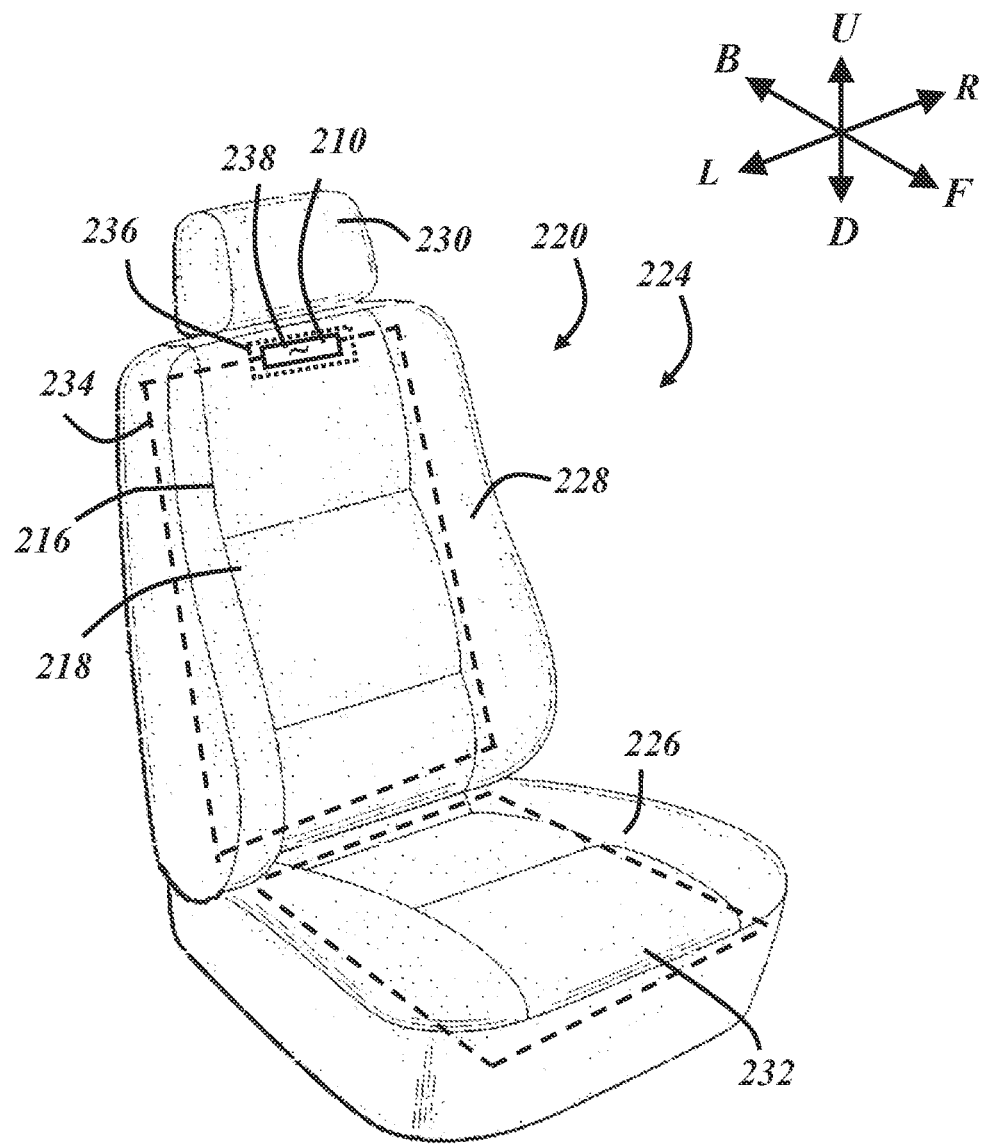
FIG. 2 is a perspective view of an embodiment of a vehicle seat showing another example trim assembly.

FIG. 2 illustrates a badge assembly 210 located on a vehicle seat 224. The seat 224 includes a seat bottom 226 that supports the majority of the weight of a seat occupant when in use and a seat back 228 extending from the seat bottom. The seat back 228 includes a head rest 230 in this example. Forward (F) and back or rearward (B) directions are designated in FIG. 2 and may be referred to as longitudinal directions. Up (U) and down (D) directions may be referred to as vertical directions, while left (L) and right (R) may be referred to as transverse directions. These directions are with respect to the properly installed badge assembly 210 and seat 224 and not necessarily with the vehicle in which the seat is installed.

The seat 224 and/or portions thereof can be considered a trim assembly 216 that includes a trim layer 218 and the badge assembly 210. The seat 224 presents a seating surface 232 that includes an exterior surface of the trim layer 218 of trim assembly 216. Each of the seat bottom 226 and the seat back 228 includes a portion of the seating surface 232, which is in contact with the seat occupant in use. The trim layer 218 covers one or more foam layers, cushions, etc. and an underlying frame 234 which is diagrammatically illustrated with dotted lines in FIG. 2. The trim layer 218 may be fabric, leather, or some other operable material and will likely depend on the specification of the particular vehicle component 220. For example, with the instrument panel 122 illustrated in FIG. 1, the trim layer 118 may be a flexible plastic skin or the like that is situated over a more rigid substrate. The trim layer 218 may be a multi-layer component itself that includes one or more spacers, adhesive layers, etc. Other materials and configurations for the trim assembly 216 and/or the trim layer 218 are certainly possible.

The badge assembly 210 is installed on the trim layer 218. There may be more than one badge assembly, or the illustrated badge assembly 210 could be located in a different location with respect to the vehicle component 220 (e.g., on the headrest 230). The illustrated configuration is merely an example. The badge assembly 210 includes a backing plate 236 that facilitates installation of a number of variations of the badge 238. The backing plate 236 is located beneath the trim layer 218. The backing plate 236 can be located directly adjacent to an underside of the trim layer 218 such that the trim layer 218 is sandwiched directly between the backing plate 236 and the badge 238. Other intervening layers may also be possible. In some embodiments, the backing plate 236 could be mounted to the frame 234 or another structural substrate beneath the trim layer 218.

Figure 5:
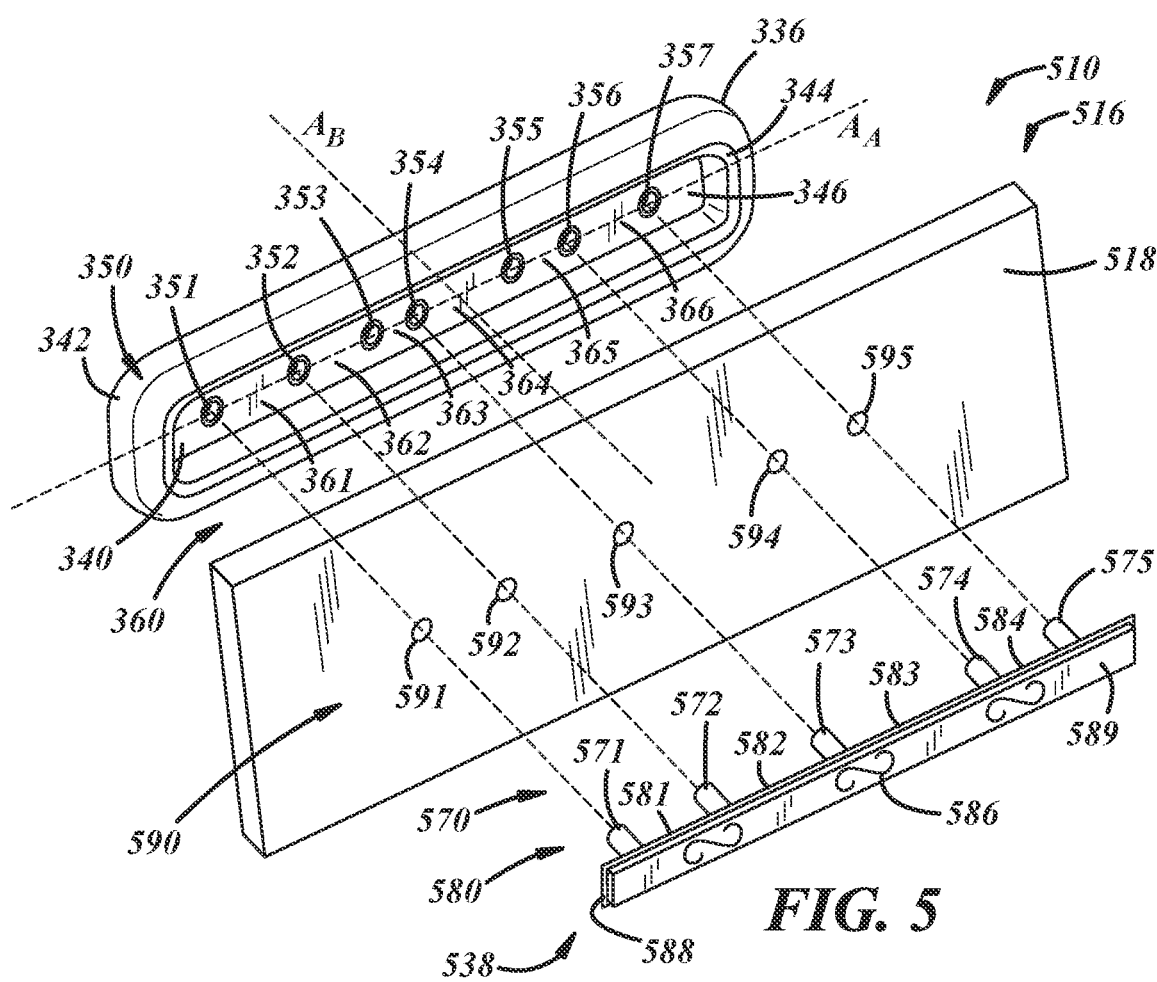

FIGS. 3 through 5 illustrate how a common backing plate 336 and badge configuration can be implemented to facilitate error-proof installation of a number of different badges 338, 438, 538, respectively. To emphasize the fact that the same backing plate 336 is used to accommodate a number of different badges, the reference numerals relating to the backing plate 336 (three-series numbers) are carried through from FIG. 3 to both FIGS. 4 and 5. Further, in FIGS. 3-5 the trim layer 318, 418, 518, is schematically illustrated as a rectangular piece or section of a larger trim piece, but it should be understood that the shape and configuration of the trim layer will depend on the structure of the vehicle component to which the badge assembly is affixed. For example, the trim layer could be a seat back covering that extends the width of the seat, or a door panel covering extending over a portion of a door panel in the vehicle.

The components in each of FIGS. 3-5 are shown as a set of trim assembly components that can be aligned as shown and assembled together into a completed trim assembly. As will be described below, this assembling is done generally by connecting the badge (338, 438, or 538), trim layer (318, 418, or 518), and backing plate 336 together with a plurality of badge studs extending through a plurality of trim holes in the trim layer and into a subset of a plurality of recesses in the backing plate.

The backing plate 336 includes a backing plate body 340 having an outer perimeter 342.

The backing plate body 340 is advantageously made of a plastic material, which can be particularly useful when using a heat stake manufacturing process to install the badge assembly 310. The backing plate body 340 also includes a raised rim 344 which defines the outer perimeter 342 and projects toward the badge 338. This raised rim 344 creates a recessed floor 346 which can better house the badge 338. However, it is possible to not have a raised rim 344. Also, the shape of the backing plate body 340 and the badge 338 is an elongated rectangular shape, but these are just examples, as other shapes are possible. Preferably, if a raised rim 344 along the outer perimeter 342 is included, it follows the shape of the outer perimeter 348 of the badge 338. This can help with locating, seating, and/or installation of the badge 338.

The backing plate 336 includes a plurality of recesses 350 that extend into the backing plate body 340 and are circumscribed by the outer perimeter 342. The recesses 350 include a first recess 351, a second recess 352, a third recess 353, a fourth recess 354, a fifth recess 355, a sixth recess 356, and a seventh recess 357. The pairs of adjacent recesses in the plurality of recesses 350 define a plurality of spaces 360, which include a first space 361, a second space 362, a third space 363, a fourth space 364, a fifth space 365, and a sixth space 366, respectively. Each space in the plurality of spaces 360 is a generally planar portion along the recessed floor 346, and each recess in the plurality of recesses 350 extends into the backing plate body 340 away from the recessed floor and the badge 338. Each recess in the plurality of recesses 350 can be a bore, and may extend only partially into the backing plate body 340, or could be an aperture (through-hole) depending on the embodiment. The recesses 350 are advantageously circular to accommodate a plurality of studs 370 on the badge 338, which are also circular. The plurality of studs 370 includes a first stud 371, a second stud 372, a third stud 373, a fourth stud 374, and a fifth stud 375, each of which extends through one of a plurality of trim holes 390 in the trim layer 318 and into one of the recesses 350 of the backing plate 336. Other shapes for the recesses 350 and/or studs 370 are certainly possible, but the circular shape may be better for press-fitting and heat staking the backing plate 336 to the badge 338. A plurality of stud spaces 380 also exists between the respective studs as well, such that there is a first stud space 381, a second stud space 382, a third stud space 383, and a fourth stud space 384.

The interrelationship between the recesses 350, the studs 370, the trim holes 390, and the various spacing arrangements for the spaces 360, 380 is designed to create the poka-yoke device. Both the recesses 350 and the studs 370 are aligned along an attachment axis $A_A$. The attachment axis $A_A$ passes through at least two recesses of the plurality of recesses 350, and these recesses are configured to accommodate the badge studs 370. In this particular embodiment, the attachment axis $A_A$ passes through all of the recesses in the plurality of recesses 350 and all of the studs in the plurality of studs 370. However, it is possible to have other recesses and/or studs that are not aligned along the attachment axis $A_A$, but in particular, a plurality of stud accommodating recesses 351, 352, 354, 355, 357 are aligned along and define the attachment axis $A_A$ (as detailed below, recesses 353, 356 are open or unoccupied in the FIG. 3 embodiment).

To prevent upside-down installation of the badge 338, the recesses 350 are arranged in the backing plate body 340 to allow for placement of the badge in the first orientation shown in FIG. 3, but if the badge is placed in a second orientation (e.g., an upside-down installation that is opposite to the first orientation shown), installation will be prevented as the studs 370 will not align with the recesses 350. This is accomplished by non-symmetrically arranging the recesses 350 (and also the studs 370) with respect to a bisecting axis $A_B$ that is orthogonal to the attachment axis $A_A$ and bisects the backing plate body 340. Given the arrangement of recesses 350 and studs 370 in this embodiment, the bisecting axis $A_B$ divides the backing plate 336 in half along its longest edge. Further, with an odd number of recesses 350, there is an unequal number of recesses on either side of the bisecting axis $A_B$. In this particular embodiment, there are four recesses 351, 352, 353, 354 located on a first side of the bisecting axis $A_B$, and three recesses 355, 356, 357 located on a second side of the bisecting axis $A_B$. As will become evident, the number and spacing of the plurality of recesses are configured to accommodate at least three stud variation spacing patterns.

The size of the spaces 360 and the recesses 350 depends at least partially on the particular configuration for the badge 338. The badge 338 in this particular embodiment includes an emblem 386 and a support plate 388. The emblem 386 is located on a metal plate 389; however, other badge structures are certainly possible. For example, the badge 338 could just be one piece, the badge as a whole or the emblem could take on a more complex geometric shape, etc. In this particular embodiment, the badge 338 is an electroform badge with the metal plate 389 being glued or otherwise adhered to the plastic support plate 388. The metal plate 389 is a nickel-based plate with a thickness of about 0.35 mm. This configuration can work particularly well with a heat stake attachment operation, but as mentioned, other configurations and attachment methods are possible.

In the illustrated badge embodiment, the plurality of studs 370 are an integral portion of the support plate 388 and extend rearwardly from a rear side of the support plate. The support plate 388 is advantageously made of plastic to promote attachment via heat staking. In particular, heat staking may be used to securely attach the badge 338 to the trim layer 318 by forming the common backing plate 316 with recesses that comprise apertures through which the badge studs 370 can pass, with the studs having a length that allows them to protrude rearwardly past the apertures when the badge is attached over the trim layer to the backing plate. The protruding portions of some or all of the studs can be heat staked to form an enlarged stud end portion that captures the backing plate and trim layer between the enlarged stud end portion and rear side of the badge.

The plurality of studs 370 correspond in number and arrangement to the plurality of trim holes 390, which includes a first trim hole 391, a second trim hole 392, a third trim hole 393, a fourth trim hole 394, and a fifth trim hole 395. The spacing between the trim holes 390 is the same as the corresponding stud spaces 380. The trim holes 390 are advantageously pre-punched holes in the trim layer 318. This can help with ensuring the proper badge is installed on the correct seat or other vehicle component. For example, if a manufacturer attempts to install the badge 438 or the badge 538 on the trim layer 318, the hole distribution for the plurality of trim holes 390 will not properly align with the stud configuration for the plurality of studs 470, 570 in the other badge implementations.

During one method of manufacture, the trim layer 318 with pre-formed trim holes 390 is situated over the backing plate 336. The badge 338 is then placed such that the studs 370 extend through each of the trim holes 390 and into the recesses 350 on the backing plate 336. The trim holes 390 can have diameter that is less than or equal to the diameter of the badge studs 370 to ensure a good fit. For example, for a leather or faux leather trim layer 318, the trim hole sizes could be 2 mm in diameter and the studs could be 3 mm in diameter so that they must be press-fit into the trim layer holes. The trim assembly 316 is then heat staked to attach the badge 338 and the backing plate 336; however, other attachment methods are certainly possible. In some embodiments, each of the plurality of badge studs 370 are equal in size and each of the plurality of trim holes 390 can thus also be equal in size, as shown. In other embodiments these sizes could be varied from stud to stud and hole to hole. Also, in some embodiments, the plurality of trim holes can be equal in number to the plurality of badge studs, but this is not strictly necessary for all embodiments.

In the backing plate 336, the size of the spaces 360 between the recesses 350 and the configuration of the recesses 350 are strategically implemented to facilitate proper attachment of the badge 338. To facilitate the three stud variation spacing arrangements depicted in FIGS. 3, 4, and 5, with the studs 370, 470, 570, respectively, it is desirable to have at least two more recesses 350 than there are studs. In the illustrated embodiment, there are five studs on each badge 338, 438, 538 and seven recesses 351-357 in the backing plate body 340. This n+2 arrangement can be used with other backing plate and badge configurations to allow for the attachment of multiple badge variations. Accordingly, when any of the badges 338, 438, 538 are attached to the backing plate 336, there are two or more open and un-used or unoccupied recesses 350.

In the FIG. 3 badge embodiment, the first stud 371 mates with the first recess 351; the second stud 372 mates with the second recess 352; the third stud 373 mates with the fourth recess 354; the fourth stud 374 mates with the fifth recess 355; and the fifth stud 375 mates with the seventh recess 357. This arrangement leaves the recesses 353, 356 unoccupied or open when the badge 338 is attached to the backing plate 336. In the illustrated embodiments, the studs 370 are about 10 mm long, and the recesses 350 are about 2-4 mm in diameter. The spaces 360 between the recesses 350 are on the order of a few millimeters as well (e.g., about 2-15 mm), and these exact sizes will vary depending on the size and structure of the badge 338.

Varying the size of the spaces 360 between the recesses 350 allows for proper installation in the illustrated orientation, but interference will prohibit upside down assembly.

The size of the spaces 360 can be measured either from the center point to center point of each neighboring recess 350, or from the edge to the edge of each neighboring recess, preferably along the attachment axis $A_A$. As shown in the figures, the size of the first space 361 is equal in size to the second space 362, but the size of the third space 363 is smaller than the first space 361. The size of the fourth space 364 is larger than any of the other spaces. The fifth space 365 and the sixth space 366 are both larger than the third space 363. This spacing helps provide the non-symmetrical arrangement along the attachment axis $A_A$, and also creates the interference such that if the badge 338 is inadvertently inverted, at least the stud 373 will not be able to mate with the recess 354. Accordingly, proper installation can be maintained.

In the FIG. 4 badge embodiment, the badge 438 can be similar to that of badge 338 of FIG. 3, excepting that it has a different emblem on its front decorative side and a different pattern of studs 470 extending rearwardly from its rear side. The first stud 471 mates with the first recess 351; the second stud 472 mates with the second recess 352; the third stud 473 mates with the third recess 353; the fourth stud 474 mates with the sixth recess 356; and the fifth stud 475 mates with the seventh recess 357. This arrangement leaves the recesses 354, 355 unoccupied or open when the badge 438 is attached to the backing plate 336. In the FIG. 5 embodiment, the badge 538 can be similar to that of badges 338, 438, excepting that it has a different emblem on its front decorative side and a different pattern of studs 570 extending rearwardly from its rear side. The first stud 571 mates with the first recess 351; the second stud 572 mates with the second recess 352; the third stud 573 mates with the fourth recess 354; the fourth stud 574 mates with the sixth recess 356; and the fifth stud 575 mates with the seventh recess 357. This arrangement leaves the recesses 353, 355 unoccupied or open when the badge 538 is attached to the backing plate 336.

In each of the badge embodiments illustrated in FIGS. 3-5, the first and last recesses 351, 357 and their associated studs act as end anchors, and the variability in spacing in the middle recesses and studs provides the poka-yoke effect, as installation will be prohibited if any of the badges 338, 438, 538 are attempted to be installed upside down from the illustrated orientation. There is also interference if, for example, a manufacturer attempts to install the wrong badge on the wrong trim layer and/or vehicle component. This error-proofing impact was assessed and verified using a stack-up analysis.

From the foregoing, it will be recognized that this first embodiment of a badge mounting system includes a set of trim assembly components in which the plurality of recesses, the plurality of trim holes, and the plurality of badge studs are each arranged non-symmetrically with respect to the bisecting axis. This is unique from the other illustrated embodiments and has the advantage that it prevents the badges from being installed in an upside-down orientation, regardless of the hole pattern in the trim layer.

As will be appreciated from the description above and the illustrations in FIGS. 3-5, the first embodiment of a badge mounting system also includes some features that are held in common with the second and third embodiments of the badge mounting system described below. In particular, each of the three badges 338, 438, 538 include a pattern of its badge studs that is different than the patterns of the other two badges. Similarly, the trim layers 318, 418, 518 each have a plurality of trim holes that correspond to the studs of their associated badges. And those trim holes for each of the trim layers are in the same pattern as the studs of its associated badge. In this way, the studs of each badge can pass through the trim holes of each trim layer. Thus, the first badge 338 and its trim layer 318 have their respective studs 370 and trim holes 390 in a first pattern, the second badge 438 and its trim layer 418 have their respective studs 470 and trim holes 490 in a second pattern, and the third badge 538 and its trim layer 518 have their respective studs 570 and trim holes 590 in a third pattern.

These three different patterns of studs and trim holes each mate with a different subset of the plurality of recesses 350 in the backing plate 336, thereby allowing use of a backing plate 336 that is common to all three badge and trim variants. More specifically, the studs 370 of the first badge 338 mate with a first subset of the recesses 350, consisting of recesses 351, 352, 354, 355, and 357, that together form the first pattern. The studs 470 of the second badge 438 mate with a second subset of the recesses 350, consisting of recesses 351, 352, 353, 356, and 357, that together form the second pattern. And the studs 570 of the third badge 538 mate with a third subset of the recesses 350, consisting of recesses 351, 352, 354, 356, and 357, that together form the third pattern.

Note that each of these subsets of recesses contain the same number n recesses out of a total of n+2 recesses, where n=5. As used herein "subset" is meant to refer to a proper subset such that the statement that a "subset of the plurality of recesses" means that the subset contains at least one less recess than the total number of recesses in the backing plate. In other embodiments, the different badge/trim variants may have a different number of studs/trim holes than one or more of the other badge/trim variants.

As a part of making the badge mounting system poka-yoke, the first, second, and third patterns of studs/holes are each arranged such that the associated badge can be mounted to the backing plate through the trim layer in only one orientation of the badge relative to the trim layer. This one orientation can also be referred to as a single orientation or a sole orientation. In some embodiments, such as are shown herein, all of the different badges are mounted in the same orientation (e.g., with its length running left-right, or horizontally), but in other embodiments one or more of the badges may properly be mounted in an orientation different from one or more other badges. For this first embodiment of the badge mounting system, the number and spacing of the available recesses in conjunction with the selection of studs and trim holes for each separate badge is what limits the attachment of the badge to only one orientation.

As another part of making the badge mounting system poka-yoke, each of the patterns of badge studs 370, 470, 570 include one or more studs that mates with one of the recesses 350 and that is located in a position within the its pattern that is unique to that pattern relative to the one of the other badges' patterns of studs, as well as having one or more studs that mates with one of the recesses 350 and that is located in a position within the its pattern that is unique to that pattern relative to the other one of the other badges' patterns of studs. This can be understood by reference to the three subsets of recesses described above—the first subset {351, 352, 354, 355, 357}, second subset {351, 352, 353, 356, 357}, and third subset {351, 352, 354, 356, 357}. As will be appreciated, these subsets each include a group of recesses that contains at least one recess not contained in one of the other two subsets and at least one recess not contained in the other one of the other two subsets. That is, none of the three subsets are equal to or are subsets of either of the other two subsets. This means that the patterns are entirely nongeneric and non-coextensive with each other, and thus these patterns can be referred to as mutually exclusive of each other.

The implication of this arrangement of mutually-exclusive patterns is that this prevents a badge corresponding to one of the trim variants from being attached to a trim layer for a different trim variant. This is due to the fact that, if a badge for one trim variant is attempted to be attached to a trim layer for a different trim variant, the mutually exclusive patterns result in contact of at least one of the badge studs with the trim layer at a location in that trim layer where there is no trim hole through which the badge stud can pass. This provides an immediate indication to the assembler that s/he has the wrong badge for that particular trim layer.

As a result of these features of the badge mounting system, the first badge 338 can be mounted to the common backing plate 336 only through the first trim layer 318 and not through the second or third trim layers 418, 518, and can only be mounted to the common backing plate 336 through the first trim layer 318 in a single orientation. Similarly, the second badge 438 can be mounted to the common backing plate 336 only through the second trim layer 418 and not through the first or third trim layers 318, 518, and can only be mounted to the common backing plate 336 through the second trim layer 418 in one orientation. And as well, the third badge 538 can be mounted to the common backing plate 336 only through the third trim layer 518 and not through the first or second trim layers 318, 418, and can only be mounted to the common backing plate 336 through the third trim layer 518 in a sole orientation.

Figure 6:
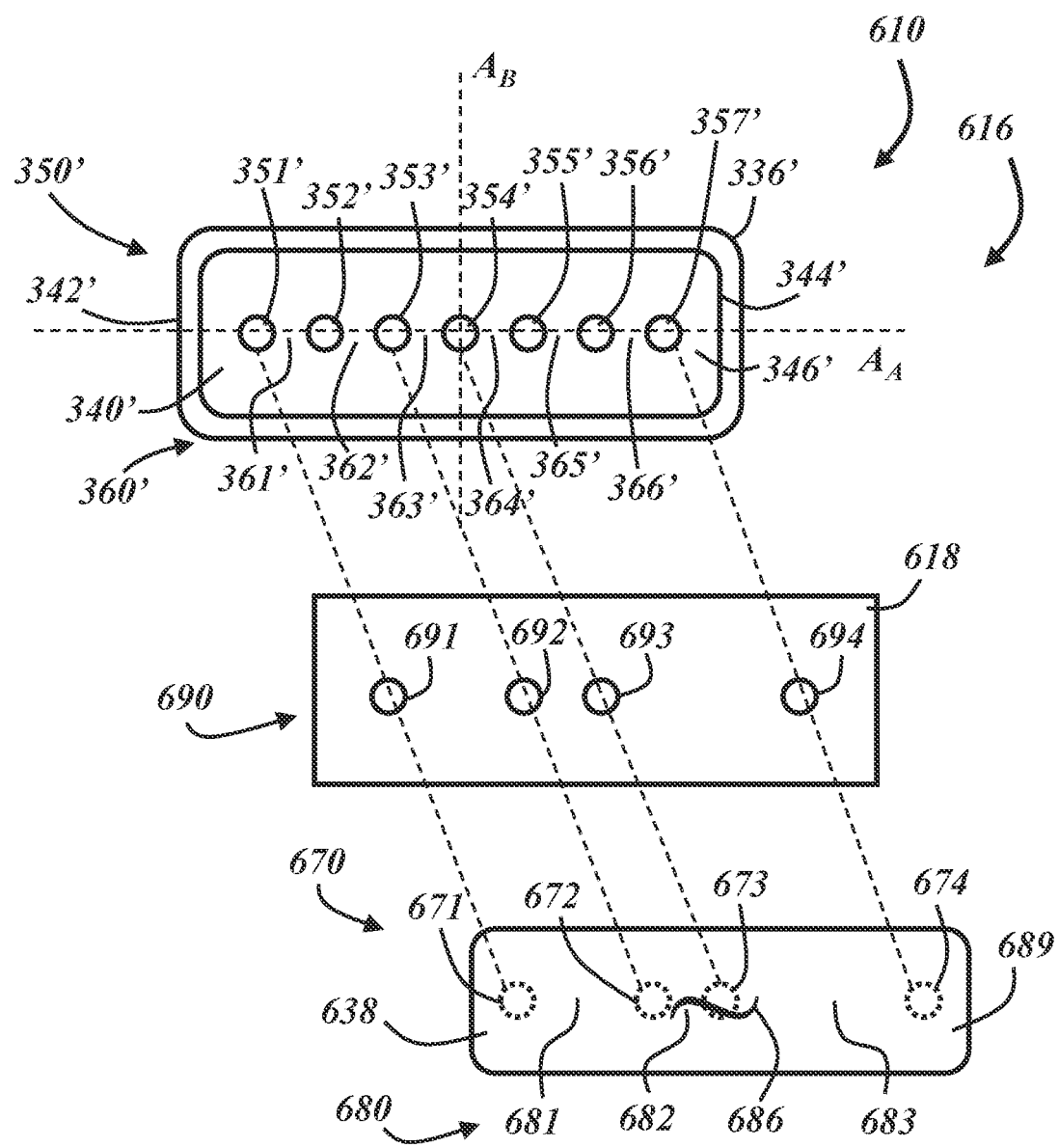
Figure 7:
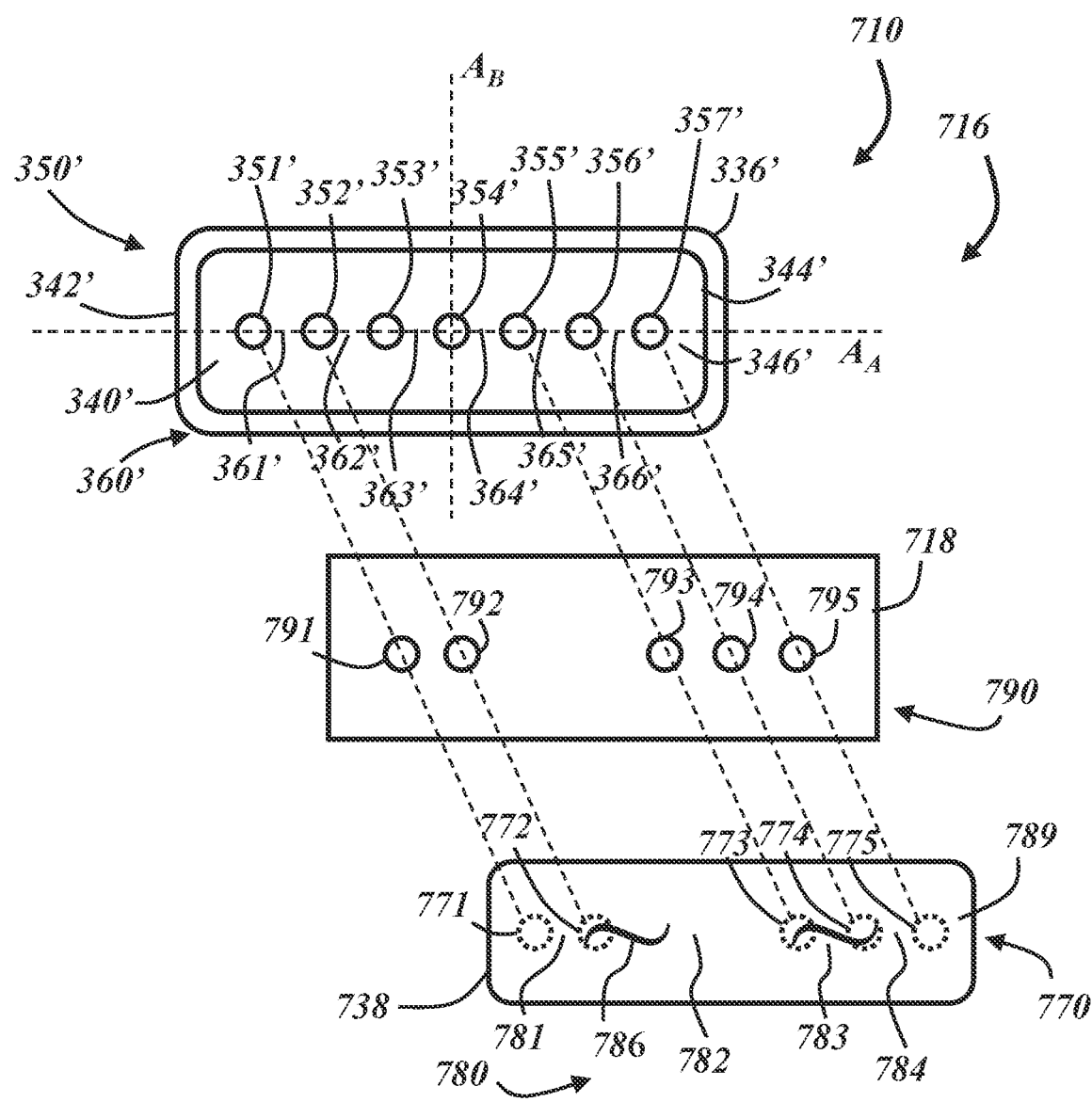

FIGS. 6 and 7 illustrate another embodiment of a badge mounting system for making trim assemblies 616, 716. In this embodiment, there is a symmetrical arrangement of recesses 350 with respect to the bisecting axis $A_B$, but there is a non-symmetrical arrangement of both the plurality of badge studs 670, 770 and the trim holes 690, 790. And, as in the FIGS. 2-5 embodiment, the different patterns of studs and trim holes work together to provide a poka-yoke badge mounting system using a common backing plate. This particular embodiment can accommodate at least two different badges 638, 738 in a manner that will prevent upside-down orientation of either badge and use of the wrong badge on a particular trim. For the FIG. 6 embodiment of the trim layer 618 and badge 638, the non-symmetrical arrangement of the plurality of trim holes 690 with respect to the bisecting axis $A_B$ of the backing plate will prohibit upside down mounting of the badge 638. Although only two badge stud and trim hole patterns are shown in FIGS. 6 and 7, at least a third unique pattern can be utilized that will prevent any incorrect orientation or mixing of badges and trims. Where only two such patterns are used, either or both of the badges 638 and 738 can have fewer badge studs, and the common backing plate 336' can also have a reduced number of recesses. For embodiments in which more than two or three badges need to be distinguished, more studs, holes, and recesses than are illustrated can be used.

The FIG. 7 embodiment of the trim layer 718 and badge 738 includes a different pattern of the badge studs 770 and trim holes 790 than that of the embodiment of FIG. 6 such that badge 738 cannot be mounted to the trim layer 618 of FIG. 6 in the proper orientation since several of the studs—772, 773, and 774—will contact the first trim layer at a location in the trim layer 618 where there is no trim hole 690 through which the badge stud can pass. Badge 738 also cannot be mounted to the trim layer 618 of FIG. 6 in an improper orientation since even if rotated, there is at least one badge stud (actually two—772 and 774) that will not line up with trim holes 690 in the trim layer 618. By comparison of FIGS. 6 and 7 it will be ready seen that the reverse is true—badge 638 cannot be mounted onto trim layer 718 due to misalignment of the studs and trim holes in any orientation.

One advantage of the embodiment of FIGS. 6 and 7 is that, since the common backing plate 336' is symmetrical about a plane containing the bisecting axis $A_B$ and orthogonal to the lengthwise alignment axis $A_A$, the mounting of the backing plate itself is more error-proof since it does not matter whether it is located behind the trim layer in either the orientation shown or in an upside-down orientation (i.e., rotated 180° about the intersection of axes $A_A$ and $A_B$). This can prevent assembly errors involving locating or attempting to locate the common backing plate in an upside-down orientation that might not match the pattern of trim holes in the trim layer.

By inspection of FIGS. 6 and 7, it will be appreciated that this second embodiment of the badge mounting system also has the same attributes noted above; namely, that the patterns of the two badges 638 and 738 both mate with the common backing plate 336', yet are arranged such that the badges cannot be attached upside-down to their respective trim layers, and are mutually exclusive of each other such that a badge for one trim variant cannot be attached to the trim layer for the other trim variant.

Figure 8:
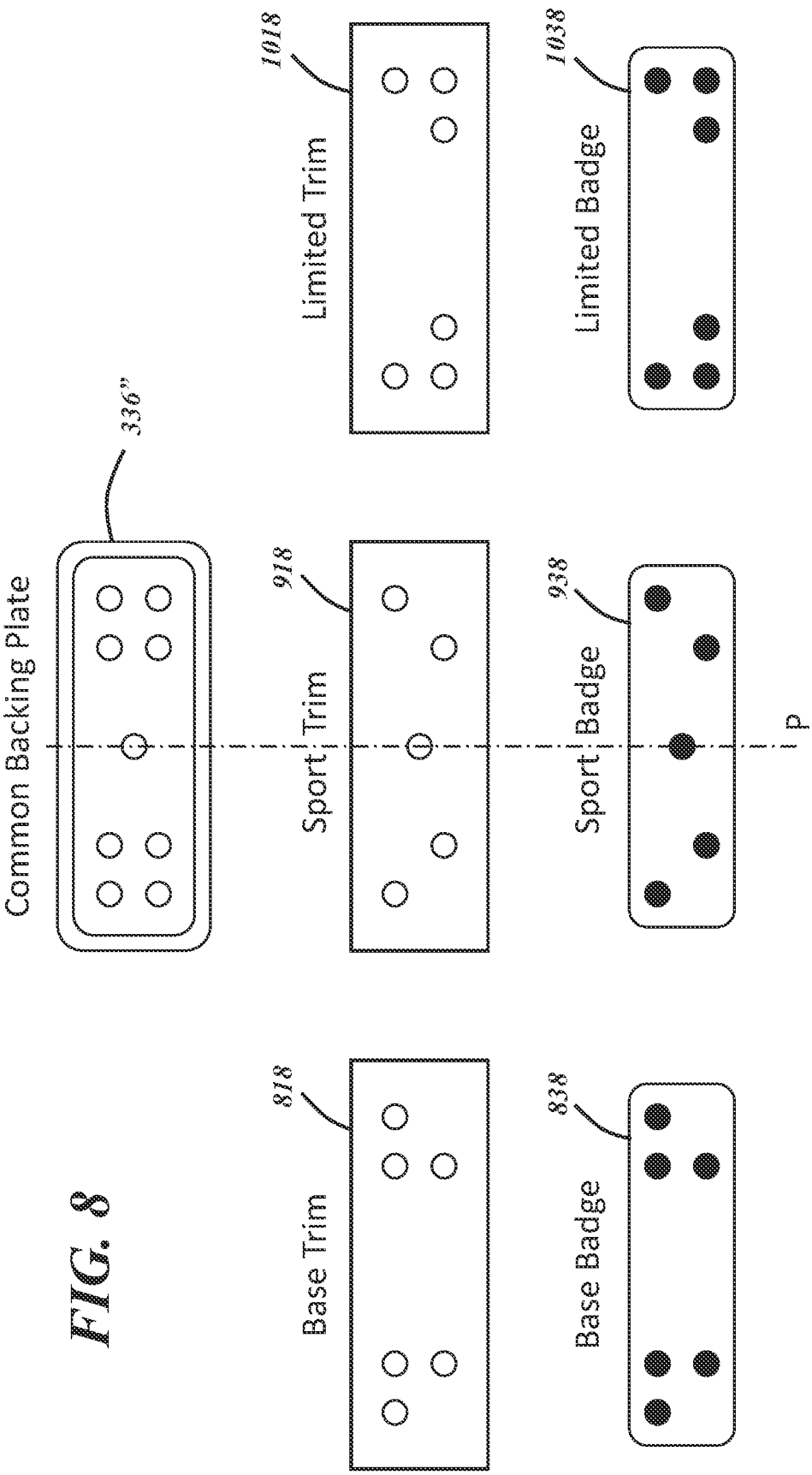
FIG. 8 is a diagrammatic view of yet another embodiment of a badge mounting system showing a common backing plate and three different badges for three different trim variants that each can be used with the common backing plate.

FIG. 8 depicts yet another embodiment of a badge mounting system comprising a set of trim assembly components including a common backing plate 336" as well as three trim and badge variants that can be used for different trim levels of a particular vehicle model. This includes a base trim layer 818, base badge 838, sport trim layer 918, sport badge 938, limited trim layer 1018, and limited badge 1038. This example is shown diagrammatically for ease of explanation, but it will be understood that all of the implementation details and features described above in connection with FIGS. 1-7 can be utilized when implementing this embodiment.

The embodiment of FIG. 8 includes rectangular badges and a rectangular backing plate as in the other embodiments, although any of a number of other shapes may be used for the badges and/or backing plate. As with the other embodiments, this embodiment uses a combination of fixturing features to provide a poka-yoke solution to mounting of several different badges on several different trims using a common backing plate. The embodiment is similar to that of FIGS. 6 and 7 in that the common backing plate is symmetrical and can be installed in either rotational orientation without causing an assembly error. This embodiment differs from the other embodiments in a couple of ways, including a layout of studs, holes, and recesses that are not all aligned along a single axis, and the use of symmetrical patterns of the studs and trim holes in a manner that prevents improper mixing of badges and trim layers and improper rotational orientation of the badges when being installed.

In particular, the fixturing features of studs, holes, and recesses are laid out two-dimensionally and not along a single axis. This can be useful for badges having a greater height to improve secure attachment of the badge at its upper and lower extremes. Furthermore, the fixturing features are symmetrically arranged on either side of a plane P that is orthogonal to a lengthwise direction of the components (i.e., in the direction of the longest dimension) and that bisects either the common backing plate and badges or their patterns of studs and recesses. This can be readily recognized from FIG. 8 as symmetry relative to a plane P that is orthogonal to the depicted surfaces of the components (e.g., "coming out of the paper") and that bisects the backing plate 336", sport trim 918, and sport badge 938. This symmetrical arrangement is not required for some embodiments, but as shown does permit a certain level of balanced attachment of the different badges without loss of the error-proof assembly advantages described herein.

As with the other embodiments, the example of FIG. 8 includes a common backing plate, and three mutually-exclusive patterns of badge studs and trim holes, each of which align with a larger pattern of recesses in the common backing plate. By inspection of FIG. 8 it will be apparent that the fundamental poka-yoke constraints implemented in the first two embodiments of FIGS. 3-7 are present in this embodiment as well, including the inability to attach any badge to its associated trim layer in anything but a single (proper) orientation and the inability to attach the badge to any of the other trim layer variants in any orientation.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all the following: "A"; "B"; "C"; "A and B"; "A and C"; "B and C"; and "A, B, and C."

The invention claimed is:

1. A set of trim assembly components, comprising:
a badge having a front decorative side and a rear side, the badge including a plurality of badge studs protruding rearwardly from the rear side in a first pattern;
a trim layer having a plurality of trim holes corresponding to the plurality of badge studs, wherein the plurality of trim holes are arranged in the first pattern and are sized such that the plurality of badge studs fit through the plurality of trim holes; and
a backing plate having a backing plate body with an outer perimeter circumscribing a plurality of recesses extending into the backing plate body, wherein the plurality of badge studs mate with a subset of the plurality of recesses that together form the first pattern, and wherein the first pattern of badge studs is arranged such that the badge mounts to the backing plate through the trim layer in only a single orientation of the badge relative to the trim layer.

2. A trim assembly comprising the set of trim assembly components of claim 1, wherein the badge, trim layer, and backing plate are assembled together with the plurality of badge studs extending through the plurality of trim holes and into the subset of the plurality of recesses to thereby form a completed trim assembly.

3. The trim assembly of claim 2, wherein at least two recesses of the plurality of recesses define an attachment axis that passes through the at least two recesses, wherein the at least two recesses accommodate at least two badge studs of the plurality of badge studs, and wherein the plurality of badge studs, the plurality of trim holes, and/or the plurality of recesses is non-symmetrically arranged with respect to a bisecting axis that is orthogonal to the attachment axis and bisects the backing plate body.

4. The trim assembly of claim 3, wherein the plurality of recesses includes a first recess, a second recess, a third recess, and a fourth recess that are all aligned along the attachment axis.

5. The trim assembly of claim 4, wherein a first space between the first recess and the second recess is equal in size to a second space between the second recess and the third recess, and wherein a first space between the first recess and the second recess is different in size than a third space between the third recess and the fourth recess.

6. The trim assembly of claim 3, wherein the plurality of recesses, the plurality of trim holes, and the plurality of badge studs are each non-symmetrically arranged with respect to the bisecting axis.

7. The trim assembly of claim 2, wherein the plurality of recesses are arranged symmetrically relative to a plane that is orthogonal to a lengthwise direction of the backing plate.

8. The trim assembly of claim 7, wherein the first pattern of badge studs is symmetrical relative to a plane that is orthogonal to a lengthwise direction of the badge.

9. The trim assembly of claim 2, wherein the plurality of recesses is configured to accommodate at least three stud variation spacing patterns.

10. The trim assembly of claim 2, wherein the recesses comprise apertures through which the badge studs can pass, wherein badge studs are made of a plastic that allow the badge to be securely attached to the backing plate by heat staking a portion of the badge studs that extend rearwardly past the apertures when the badge is attached over the trim layer to the backing plate.

11. The trim assembly of claim 2, wherein the badge includes an emblem comprising the front decorative side and a support plate comprising the rear side and the plurality of badge studs.

12. A badge mounting system for use in mounting different badges that designate different trim variants of a vehicle model or vehicle component, comprising:
the set of trim assembly components of claim 1, wherein the trim layer comprises a first trim layer and the badge comprises a first badge corresponding to a first trim variant;
a second badge corresponding to a second trim variant, the second badge having a front decorative side that is different than the front decorative side of the first badge and having a rear side with a plurality of badge studs protruding rearwardly from the rear side of the second badge, the plurality of badge studs of the second badge being arranged in a second pattern that is different than the first pattern;
wherein the subset of the plurality of recesses that forms the first pattern comprises a first subset of recesses, and wherein the plurality of badge studs of the second badge mate with a second subset of the plurality of recesses of the backing plate that together form the second pattern, whereby the backing plate comprises a common backing plate that can be used for either the first or second trim variants.

13. The badge mounting system of claim 12, further comprising a second trim layer having a plurality of trim holes arranged in the second pattern and sized such that the plurality of badge studs of the second badge fit through the plurality of trim holes of the second trim layer, wherein the second pattern of badge studs is arranged such that the second badge mounts to the common backing plate through the second trim layer in only one orientation of the second badge relative to the second trim layer, and wherein each of the first and second patterns of badge studs include at least one badge stud that is located in a position within its respective pattern that is unique to that pattern relative to the other pattern, whereby the first badge cannot be mounted onto the second trim layer due to contact of the at least one badge stud with the second trim layer at a location in the second trim layer where there is no trim hole through which the at least one badge stud can pass, and whereby the second badge cannot be mounted onto the first trim layer due to contact of the at least one badge stud with the first trim layer at a location in the first trim layer where there is no trim hole through which the at least one badge stud can pass.

14. The badge mounting system of claim 13, further comprising:

a third badge corresponding to a third trim variant, the third badge having a front decorative side that is different than the front decorative side of the first and second badges and having a rear side with a plurality of badge studs protruding rearwardly from the rear side of the third badge, the plurality of badge studs of the third badge being arranged in a third pattern that is different than the first and second patterns; and a third trim layer having a plurality of trim holes arranged in the third pattern and sized such that the plurality of badge studs of the third badge fit through the plurality of trim holes of the third trim layer, wherein the plurality of badge studs of the third badge mate with a third subset of the plurality of recesses of the backing plate that together form the third pattern, and wherein the third pattern of badge studs is arranged such that the third badge mounts to the backing plate through the trim layer in a sole orientation of the third badge relative to the third trim layer.

15. The badge mounting system of claim 14, wherein the third pattern of badge studs includes one or more badge studs that mates with one of the plurality of recesses and that is located in a position within the third pattern that is unique to that pattern relative to the first pattern of badge studs, and wherein the third pattern of badge studs includes one or more badge studs that mates with one of the plurality of recesses and that is located in a position within the third pattern that is unique to that pattern relative to the second pattern of badge studs, whereby the first badge mounts to the common backing plate only through the first trim layer and not through the second or third trim layers, and mounts to the common backing plate through the first trim layer only in the single orientation, and whereby the second badge mounts to the common backing plate only through the second trim layer and not through the first or third trim layers, and mounts to the common backing plate through the second trim layer only in the one orientation, and whereby the third badge mounts to the common backing plate only through the third trim layer and not through the first or second trim layers, and mounts to the common backing plate through the third trim layer only in the sole orientation.

* * * * *